US012724958B2

(12) United States Patent
Su et al.

(10) Patent No.: US 12,724,958 B2
(45) Date of Patent: Sep. 1, 2026

(54) AUTOMATED PATTERN-BASED EDITING USING HUMAN-COMPUTER INTERACTION ANALYSIS

(71) Applicant: International Business Machines Corporation, Armonk, NY (US)

(72) Inventors: Jun Su, Beijing (CN); Su Liu, Austin, TX (US); Yang Liang, Beijing (CN); Jennifer Sparks, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 18/607,917

(22) Filed: Mar. 18, 2024

(65) Prior Publication Data

US 2025/0292002 A1 Sep. 18, 2025

(51) Int. Cl.
*G06F 40/166* (2020.01)
*G06N 20/00* (2019.01)
*G06F 40/279* (2020.01)

(52) U.S. Cl.
CPC ........... *G06F 40/166* (2020.01); *G06N 20/00* (2019.01); *G06F 40/279* (2020.01)

(58) Field of Classification Search
CPC .................................................... G06F 40/166
USPC ........................................................ 715/256
See application file for complete search history.

(56) References Cited

U.S. PATENT DOCUMENTS 7,111,238 B1 * 9/2006 Kuppusamy .......... G06F 40/103 715/269
10,409,892 B2 * 9/2019 Rothschiller ......... G06F 40/103
11,233,920 B1 * 1/2022 Wang .................... G06F 3/1208
11,526,368 B2 * 12/2022 Karashchuk .......... G06F 3/0482
11,681,865 B2 * 6/2023 Chan .................... G06F 40/242 715/230
11,875,136 B2 * 1/2024 Araujo Soares ...... G06F 40/279
(Continued)

FOREIGN PATENT DOCUMENTS

EP 0650129 A2 4/1995
JP 7177775 B2 11/2022

OTHER PUBLICATIONS

"Cognitive Content Formatting for Authors (CCFA)", An IP.com Prior Art Database Technical Disclosure, IP.com No. IPCOM000261474D, IP.com Electronic Publication Date: Mar. 7, 2020, 6 pps., <https://priorart.ip.com/IPCOM/000261474>.

*Primary Examiner* — Reza Nabi
(74) *Attorney, Agent, or Firm* — James L. Olsen

(57) ABSTRACT

Provided is a method, system, and computer program product for implementing automated pattern-based editing techniques using human-computer interaction (HCI) analysis. A processor may monitor, using HCI analysis, editing operations of a set of text of an electronic document. The processor may analyze the editing operations of the set of text to identify an editing pattern. The processor may search the electronic document to identify a similar set of text to be edited based on the identified editing pattern. The processor may generate, based on the editing pattern, an automated editing command script to perform the editing operations on the similar set of text. The processor may deploy the automated editing command script to apply the editing operations automatically to the similar set of text of the electronic document.

11 Claims, 9 Drawing Sheets

(56) References Cited

U.S. PATENT DOCUMENTS

| | | | | |
|---|---|---|---|---|
| 11,900,080 | B2 * | 2/2024 | Wilson-Thomas | G06F 8/33 |
| 11,928,604 | B2 * | 3/2024 | Cheyer | G06F 9/54 |
| 11,941,372 | B2 * | 3/2024 | Barik | G06F 40/166 |
| 12,087,308 | B2 * | 9/2024 | Gruber | G06F 16/2457 |
| 2009/0292987 | A1 * | 11/2009 | Sorenson | G06F 40/103<br>715/255 |
| 2019/0311022 | A1 * | 10/2019 | Fan | G06F 40/166 |
| 2022/0405465 | A1 * | 12/2022 | Edge | G06F 40/16 |
| 2023/0024774 | A1 * | 1/2023 | Smith | G06F 16/93 |
| 2023/0259781 | A1 * | 8/2023 | Ittycheriah | G06N 3/084<br>715/231 |
| 2025/0252376 | A1 * | 8/2025 | Singh | G06F 9/454 |

* cited by examiner

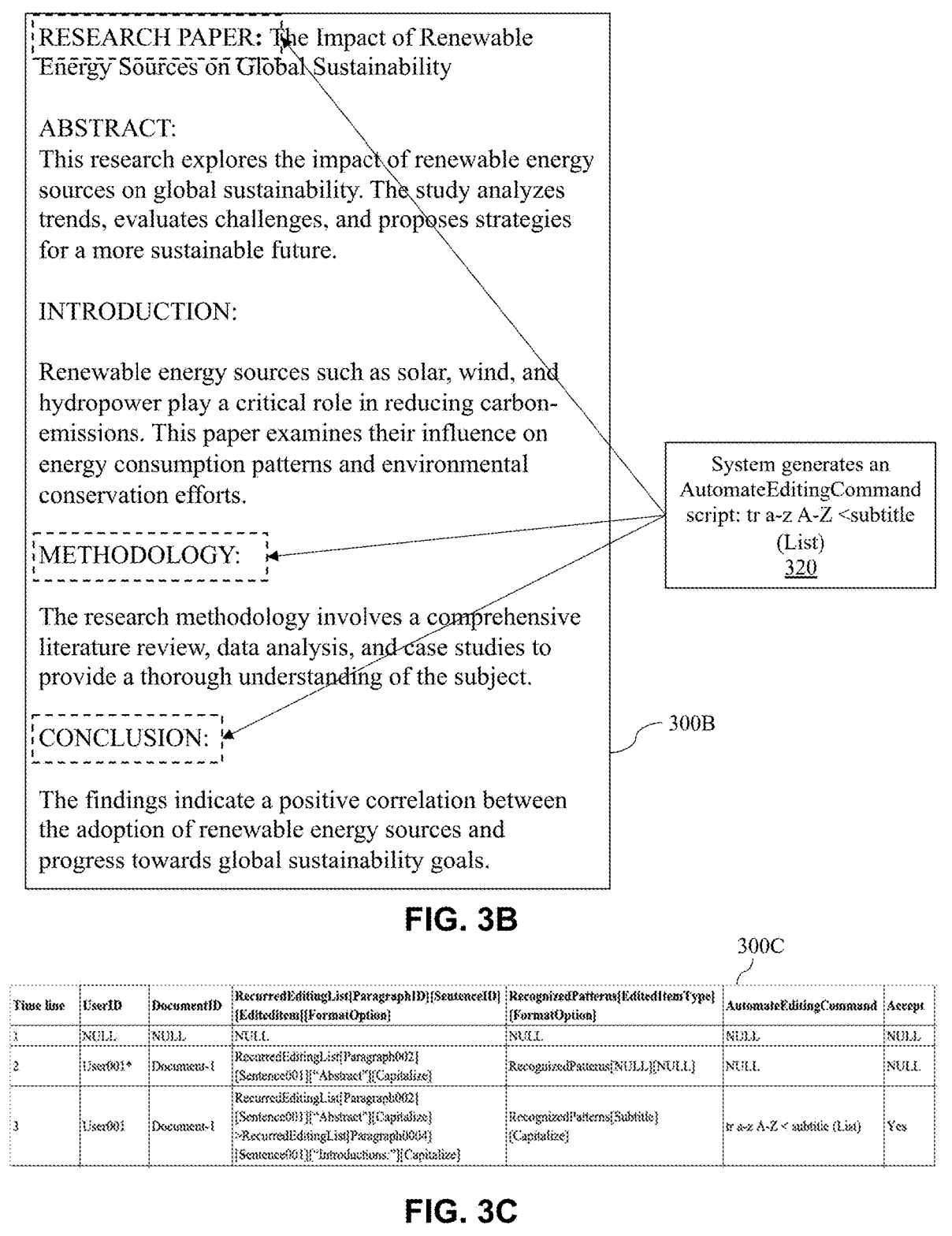

| Time line | UserID | DocumentID | RecurredEditingList[ParagraphID][SentenceID][EditedItem][FormatOption] | RecognizedPatterns[EditedItemType][FormatOption] | AutomateEditingCommand | Accept |
|---|---|---|---|---|---|---|
| 1 | NULL | NULL | NULL | NULL | NULL | NULL |
| 2 | User001* | Document-1 | RecurredEditingList[Paragraph002][Sentence001]["Abstract"][Capitalize] | RecognizedPatterns[NULL][NULL] | NULL | NULL |
| 3 | User001 | Document-1 | RecurredEditingList[Paragraph002][Sentence001]["Abstract"][Capitalize] >RecurredEditingList[Paragraph0004][Sentence001]["Introductions:"][Capitalize] | RecognizedPatterns[Subtitle][Capitalize] | tr a-z A-Z < subtitle (List) | Yes |

FIG. 3C

AUTOMATED PATTERN-BASED EDITING USING HUMAN-COMPUTER INTERACTION ANALYSIS

BACKGROUND

The present disclosure relates generally to electronic document editing, particularly focusing on the implementation of automated pattern-based editing techniques using human-computer interaction (HCl) analysis. These techniques aim to reduce the number of editing actions required by a user by performing automated batch editing of a document using learned patterns.

In the rapidly advancing landscape of document editing technologies, traditional tools and software have seen significant enhancements to meet the growing demands for efficiency, collaboration, and personalization. While conventional word processors offer a range of formatting options, the rise of artificial intelligence (AI) and machine learning has opened new possibilities for more intelligent and adaptive editing experiences.

SUMMARY

Embodiments of the present disclosure include a method, system, and computer program product for implementing automated pattern-based editing techniques using human-computer interaction (HCl) analysis. A processor may monitor, using HCl analysis, editing operations of a set of text of an electronic document. The processor may analyze the editing operations of the set of text to identify an editing pattern. The processor may search the electronic document to identify a similar set of text to be edited based on the identified editing pattern. The processor may generate, based on the editing pattern, an automated editing command script to perform the editing operations on the similar set of text. The processor may deploy the automated editing command script to apply the editing operations automatically to the similar set of text of the electronic document.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3A illustrates an example electronic document with manual text edits, in accordance with some embodiments of the present disclosure.

FIG. 3B illustrates an example electronic document with automated pattern-based text edits, in accordance with some embodiments of the present disclosure.

FIG. 3C illustrates an example automated pattern-based editing data table, in accordance with some embodiments of the present disclosure.

Figure 1:
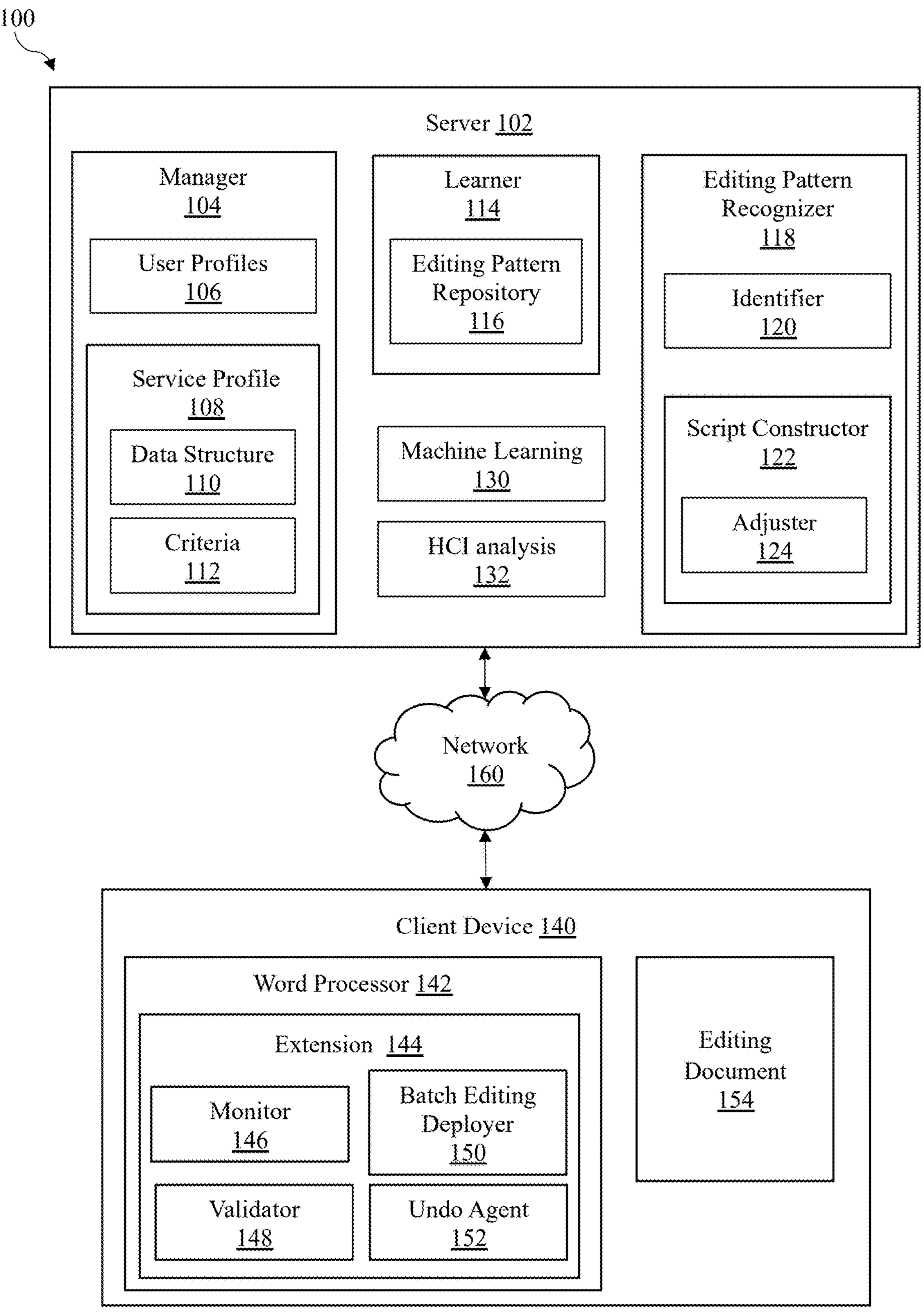
FIG. 1 illustrates a block diagram of an example automated pattern-based editing system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to automated electronic document editing and, more particularly, to implementing automated pattern-based batch editing techniques using human-computer interaction (HCl) analysis. These techniques aim to reduce the number of editing actions required by a user by performing automated batch editing of an electronic document using learned patterns. While the present disclosure is not necessarily limited to such applications, various aspects of the disclosure may be appreciated through a discussion of various examples using this context.

Efficient editing workflows are crucial as the volume of digital content increases, necessitating tools that not only offer rich formatting features but also streamline repetitive tasks. Recognizing and automating editing patterns, such as formatting choices and capitalization styles, can significantly enhance efficiency and user experience. Modern word processors provide various formatting options, including bold, italics, font styles, text color, highlighting, alignment, bullet points, numbering, line spacing, margins, page layout, headers, footers, tables, hyperlinks, images, and shapes, allowing users flexibility in document creation.

However, traditional workflows often face challenges of inefficiencies, manual repetition, and inconsistencies across collaborative projects. Automation of editing pattern identification, user-defined styles, and enforcing consistency becomes crucial. Adapting to user preferences, learning from Human-Computer Interactions (HCl), and incorporating intelligent analysis into document editing tools address issues of evolving user styles and missed opportunities for proactive assistance. The goal is to provide a more intelligent approach to document editing by analyzing patterns, incorporating user feedback, and bringing sophistication to the tools.

Embodiments of the present disclosure provide a method, system, and computer program product for implementing automated pattern-based batch editing techniques using HCl analysis. The automated pattern-based editing system (or Editing Pattern-based Batch Editing (EPBE) Bot) is an innovative approach to document editing, designed to address inefficiencies, enhance user experience, and promote consistency in formatting. Leveraging machine learning and HCl principles, the automated pattern-based editing system introduces novel features that set it apart from conventional editing tools.

In embodiments, the automated pattern-based editing system monitors, using HCl analysis, editing operations of a set of text of an electronic document. The automated pattern-based editing system distinguishes itself through its automatic recognition of recurring editing patterns based on user behavior. This innovative system learns from user-specific patterns, setting it apart from conventional editing tools and enabling intelligent automation.

In embodiments, the automated pattern-based editing system analyzes the editing operations of the set of text to identify an editing pattern. The core functionality of the automated pattern-based editing system lies in its ability to autonomously recognize and learn from user-specific editing patterns. Through an intelligent editing pattern recognition, the system analyzes a user's editing history, identifying recurred editing consistently applied across documents. This pattern recognition serves as the foundation for the automated pattern-based editing system.

In embodiments, the automated pattern-based editing system searches the electronic document to identify a similar set of text to be edited based on the identified editing pattern. For example, the system will identify all recognized or similar text requiring edits based on the identified editing pattern.

In embodiments, the automated pattern-based editing system generates, based on the editing pattern, an automated editing command script to perform the editing operations on the similar set of text. The generated script introduces a batch editing functionality that automates formatting changes across multiple instances of identified patterns in text of an electronic document, streamlining repetitive tasks and ensuring consistency with reduced manual effort.

In embodiments, the automated pattern-based editing system deploys the automated editing command script to apply the editing operations automatically to the similar set of text of the electronic document. In embodiments, the automated editing command script may apply batch editing to all recognized text requiring edits based on the identified editing pattern. In this way, batch editing functionality enables automated and uniform formatting changes across multiple instances of recognized patterns.

In embodiments, an adaptive machine learning model employs machine learning algorithms to evolve the system's behavior over time, continuously improving its ability to recognize and apply relevant editing patterns.

In embodiments, the automated pattern-based editing system excels in intelligent analysis of document content, proactively recognizing and applying formatting based on content semantics beyond simple keyword matching. It significantly enhances efficiency and timesaving by automating repetitive tasks, reducing the time and effort required for manual formatting changes. In this way, this novel system introduces a concept and method with intelligent editing pattern recognition, adaptive learning, and user-centric customization, making it an efficient and groundbreaking tool in the realm of document editing.

The automated pattern-based editing system introduces a paradigm shift in document editing, moving beyond static tools to embrace intelligent, learning based approaches. By automating repetitive tasks, ensuring collaborative editing consistency, and adapting to user preferences, the automated pattern-based editing system represents a significant advancement in the quest for more efficient and user-centric document editing solutions.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example pattern-based editing system 100, in accordance with embodiments of the present disclosure. In the illustrated embodiment, automated pattern-based editing system 100 includes server 102 that is communicatively coupled to client device 140 via network 160. Server 102 may be configured as and/or reside on any type of computer system/network and include components similar to computer system 601 and/or 700 as described in FIG. 6 and FIG. 7, respectively. In embodiments, server 102 may include various additional components such as processors, memories, networks, etc., but for brevity, these components are not included in the figure. Client device 140 may be configured as any type of computer system and may be substantially similar to computer system 601 detailed in FIG. 6. Client device 140 may include various components such as processors, memories, networks, etc., but for brevity, these components are not included in the figure.

Network 160 may be any type of communication network, such as a wireless network or a cloud computing network. Network 160 may be substantially similar to, or the same as, a computing environment 700 described in FIG. 7. In some embodiments, network 160 can be implemented within a cloud computing environment or using one or more cloud computing services. Consistent with various embodiments, a cloud computing environment may include a network-based, distributed data processing system that provides one or more cloud computing services, where machine learning model algorithms, processes, and/or training may be executed. Further, a cloud computing environment may include many computers (e.g., hundreds or thousands of computers or more) disposed within one or more data centers and configured to share resources over network 160. In some embodiments, network 160 can be implemented using any number of any suitable communications media.

In the illustrated embodiment, server 102 includes manager 104, learner 114, editing pattern recognizer 118, machine learning component 130, and human-computer interaction (HCl) analysis component 132.

In embodiments, manager 104 includes user profiles 106 and service profiles 108 which includes data structure 110 and criteria 112. Manager 104 is configurable such that it allows administrators and/or users of the system to customize pattern-based editing settings. The settings may be adjusted for specific user profiles 106 or for service profiles 108. For example, criteria 112 may include what type of HCl data is input/output by the system to make automated editing pattern decisions. For example, formatting options (e.g., font type/size/color, highlight colors, bold, italicized, and underlined text, etc.), editing item type of the electronic document (e.g., subtitle, subject, verb, verb+ing, human names, phone numbers, numeric number, etc.), default format mode (automated, agreement based, sing/multiple files), undo option, etc. may all be configurable criteria 112 of the system 100.

Data structure 110 is configured for storing and/or tracking various attributes related to edit operations of an electronic document or editing document 154. For example, data structure 110 may include various data editing attributes such as User ID, Document ID, a Recurred Editing List, Paragraph ID, Sentence ID, Edited Item, Format Option, Recognized Patterns, Edited ItemType, Format Option, Automate Editing Command, Accepted edits, etc. Data structure 110 may be used by the system 100 when identifying editing patterns for a user(s).

In embodiments, learner 114 includes editing pattern repository 116. Learner 114 is configured to analyze and learn a user's editing patterns (e.g., format options, formatting techniques) from the user's editing operations (e.g., recurred editing) on monitored and/or sampled data of HCl. For example, learner 114 may utilize HCl analysis component 132 to analysis the user's editing patterns.

In embodiments, editing pattern recognizer 118 includes identifier 120 and script constructor 122 which further includes adjuster 124. The editing pattern recognizer 118 is configured to recognize the recurring editing patterns based on user behavior and compare the learned editing patterns identified by learner 114. The identifier 120 is configured to search for the recognized edited pattern in the rest of editing document 154 and identify all potential items or same/similar text (e.g., words, phrases, types, etc.) that requires the same or similar formatting based on the recognized editing pattern.

In embodiments, the script constructor 122 is configured to construct or generate an automated editing command script for changing the format of all identified potential items with a same/similar text within the editing document. In embodiments, adjuster 124 is configured to adjust the criteria 112 and or update various command scripts based on the user feedback and validation data.

In embodiments, HCl analysis component 132 is configured to monitor the user-computer interactions with the editing document 154 and identify the user's editing goals (e.g., editing pattern) for the document. The HCl analysis component 132 is configured to continually monitor feedback received form the user and implement iterative changes to the automated pattern-based editing commands to achieve an optimal balance of usability, efficiency, and user satisfaction for automated editing.

In the illustrated embodiment, client device 140 includes word processor 142 and editing document 154 (e.g., an electronic document such as an editable word processing document, editable pdf document, editable presentation document, and the like).

In embodiments, word processor 142 may include extension 144. Extension 144 may be configured as a plugin and/or application which can be installed in online/offline word/text processor (e.g., Word®, PowerPoint®, HTML Editor, Adobe® Editor, etc.) level for editing a text document with enabled automated pattern-based editing/batch editing features. Extension 144 may include monitor 146, validator 148, batch editing deployer 150, and undo agent 152.

Monitor 146 is configured to monitor a user's editing operations (e.g., recurred editing such as selecting text to highlight, changing text color, change font type and/or size, and the like) in HCl level. The monitored information can be integrated into the data structure of the client device 140.

Batch editing deployer 150 is configured to deploy and/or execute the constructed automated editing command script that was generated by the script constructor 122. The command script is configured to perform a batch editing operation and change the formats of all identified potential items/similar text with the same/similar pattern within the editing document 154.

Validator 148 is configured to allow the user to validate the automated formatting changes and undo the changes based on validation result. If the automated formatting changes are incorrect/invalid, the undo agent 152 is configured to restore invalidated automated formatting changes back to the previous formats. Adjuster 124 may adjust the criteria 112 and or update various command scripts based on the user feedback and validation data generated by the validator 148 and/or undo agent 152.

In embodiments, the machine learning component 130 or machine learning model is trained on a portion of the data and then validated on the remaining portions, repeatedly across different combinations of training and validation data sets and/or electronic documents. For example, the machine learning component 130 may be trained to identify one or more editing operations by analyzing historical user editing operations of various sections, texts, and/or phrases of a plurality of electronic documents. The machine learning component 130 may generate, based on the training, an editing pattern repository comprising a plurality of editing patterns that were determined from the historical data. The machine learning component 130 and/or other components (HCl analysis 132, learner 114, editing patter recognizer 118, etc.) of the server 102 may utilize the plurality of editing patterns when making editing predictions or recognitions of editing patterns for a given user when editing a document.

In some embodiments, server 102 may use machine learning component 130 to continuously run rounds of experiments to generate additional useful training data. For example, when a new set of inputs (e.g., new data inputs collected after receiving feedback such as validation data or undo agent data in response to deploying an automated editing command script) are presented to the machine learning component 130, it may prescribe training types based on the past actions for similar inputs. As the training data expands, the machine learning model is periodically retrained and/or refactored, resulting in increasingly accurate predictions of valid configuration parameter values that are likely to affect performance metrics of the machine learning component 130. The results from prior experimentation are used to determine configuration and/or editing pattern variations and/or training type selections from which to gather data for future experiments. In this way, the system can adaptively adjust and improve recognizing and implementing automated pattern-based editing over time.

FIG. 1 is intended to depict the representative major components of automated pattern-based editing system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with automated pattern-based editing system 100 may not be present, and the arrangement of components may vary. For example, while FIG. 1 illustrates an example automated pattern-based editing system 100 having a single server 102 and a client device 140 that are communicatively coupled via a single network 160, suitable network architectures for implementing embodiments of this disclosure may include any number of servers, client devices, and networks. The various models, modules, systems, and components illustrated in FIG. 1 may exist, if at all, across a plurality of servers, client devices, and networks.

Figure 2:
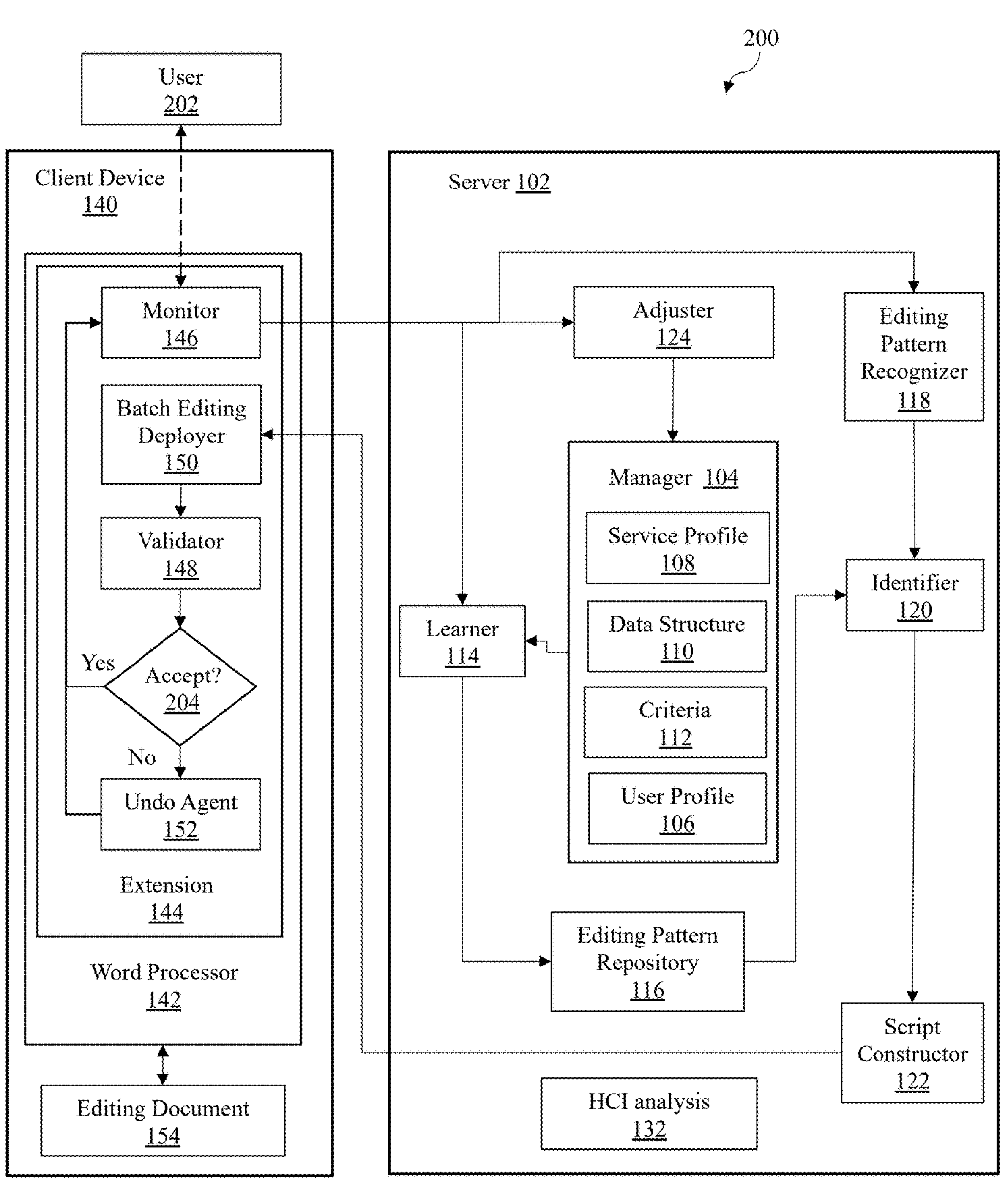
FIG. 2 illustrate a flow diagram for automated pattern-based editing of an electronic document using an automated pattern-based editing system, in accordance with some embodiments of the present disclosure.

Referring now to FIG. 2, shown is a flow diagram 200 for automated pattern-based editing of an electronic document using the automated pattern-based editing system 100, in accordance with some embodiments of the present disclosure. In the illustrated embodiment, user 202 utilizes word processor 142 on client device 140 to edit editing document 154. As user 202 edits the document, extension 144 utilizes monitor 146 to monitor editing operations that are implemented by the user on the editing document.

In embodiments, as the user 202 edits the document, learner 114 analyzes the user's editing patterns and the set of text of the editing document 154 that the user edits. For example, learner 114 may identify/learn formatting patterns (e.g., capitalization, bolding, highlight, etc.) to various sets of text words or phrases by analyzing the user's editing operations (recurred editing) on monitored data. In embodiments, the learner 114 may utilize HCl analysis component 132 to analyze the user's editing patterns. The learned editing pattern(s) may be stored in editing pattern repository 116.

In embodiments, editing pattern recognizer 118 may use the monitored and/or learned recurring editing patterns based on user behavior in comparison with the learned editing patterns from the editing pattern repository 116 to determine user 202's recognized editing pattern. The identifier 120 searches for the recognized editing pattern in the rest of editing document 154 and identifies all potential items or similar text (e.g., words, phrases, types, etc.) that should be formatted with same/similar editing pattern based on the user's learned editing behavior.

In embodiments, the script constructor 122 generates an automated editing command script based on recognized editing pattern and sends the command script to the batch editing deployer 150. The batch editing deployer implements/deploys the automated editing command script on the editing document 154 where all remaining potential items or similar text (e.g., words, phrases, types, etc.) that should be formatted with same/similar editing pattern are automatically formatted, accordingly.

In embodiments, validator 148 determines if the automated editing command script is valid by requesting and/or monitor user feedback regarding the implemented formatting changes. If the automated editing command script was accurate and/or valid in implementing the formatting changes, then the user accepts the formatting changes ("Yes" at 204), and the system returns to monitoring further user editing operations/patterns of the document. If the automated editing command script was inaccurate and/or invalid when implementing the formatting changes, then the user does not accept the formatting changes ("No" at 204) and the undo agent 152 restores invalidated automated formatting changes back to the previous formats. In embodiments, adjuster 124 may adjust the criteria 112 and or update various command scripts based on the user feedback and validation data.

In this way, the automated pattern-based editing system excels in intelligent analysis of document content, proactively recognizing and applying formatting based on content semantics beyond simple keyword matching. It significantly enhances efficiency and timesaving by automating repetitive tasks, reducing the time and effort required for manual formatting changes. The novel system introduces a concept and method with intelligent editing pattern recognition, adaptive learning, and user-centric customization, making it an efficient and groundbreaking tool in the realm of document editing.

Figure 3A:
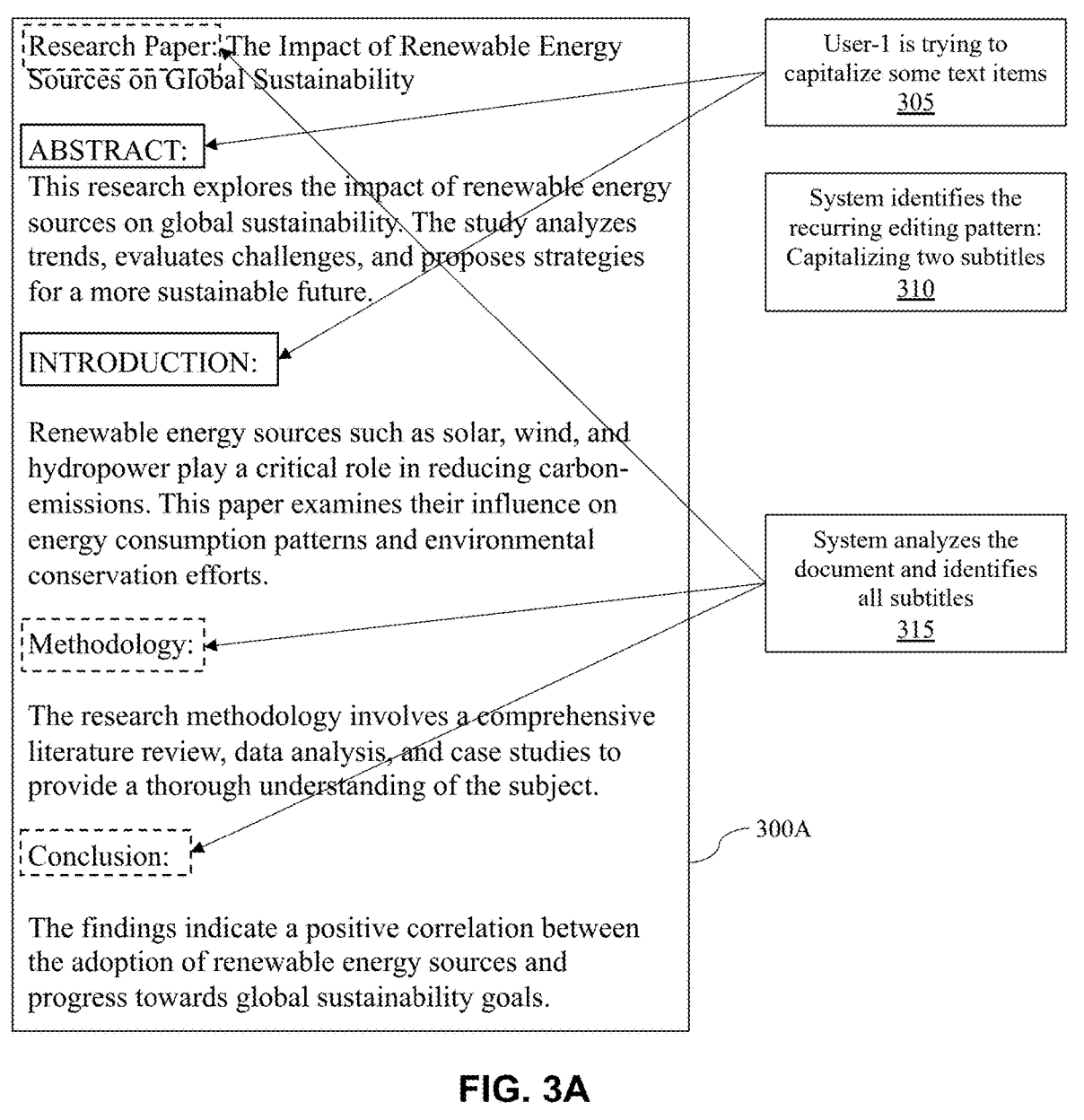

Referring now to FIG. 3A, shown is an example electronic document 300A with manual text edits, in accordance with some embodiments of the present disclosure. The following example descries improvement to repetitive document formatting. User-1 may be a content creator who frequently works on documents that require consistent formatting for specific phrases or terms. However, manually applying the same formatting changes across multiple occurrences of these phrases within the document becomes time-consuming and error prone. This repetitive task not only hampers the user's productivity but also introduces the risk of overlooking instances where the formatting should be applied.

In the illustrated embodiments, user-1 is capitalizing various headings (e.g., "ABSTRACT" and "INTRODUCTION") on electronic document 300A, shown at 305. In embodiments, the system is configured to identify the recurring editing pattern (e.g., capitalizing two subtitles of the electronic document), shown at 310. The system analyzes the textual content of the electronic document 300A and identifies all/additional subtitles of the document, shown at 315.

Referring now to FIG. 3B, shown is an example electronic document 300B with automated pattern-based text edits, in accordance with some embodiments of the present disclosure. In the illustrated embodiments, based on the analysis of the learned editing pattern and the textual content and data structure of the document, the system generates an automate editing command script; tr a-z A-Z<subtitle> (List) to perform automated pattern-based batch editing, shown at 320. The system deploys the script and all remaining subtitles (e.g., "RESEARCH PAPER", "METHODOLOGY", and "CONCLUSION") are automatically capitalized by the script as shown in the electronic document 300B. It is noted that the automate editing command script "tr a-z A-Z<subtitle> (List)" is just an example of an editing script string and is not meant to be limiting. The script may be configured to apply any kind editing commands (color, font style/size, typing face, glyph type, format, style, rendering, lowcase2uppercase, uppercase2lowercase, single/double strikethrough, underline, upper script, subscript, etc.) in any kind of editing script languages.

Referring now to FIG. 3C, shown is an example automated pattern-based editing data table 300C, in accordance with some embodiments of the present disclosure. In the illustrated embodiment, the data table 300C tracks various editing data that are implemented on the electronic document. This data may be used to identify various editing patterns and construct automated editing command scripts that are deployed/executed on the electronic document.

In this way, the pattern-based editing system, equipped with editing pattern-based recognition and batch editing functionality, can learn from User-1's editing patterns. If the user consistently applies a specific formatting style to certain phrases, the system recognizes this pattern and automates the formatting changes across the entire document. Additionally, with HCl analysis, the system adapts to any adjustments or new patterns that the user introduces during their editing process, providing a seamless and efficient solution to her repetitive formatting needs.

Figure 4A:
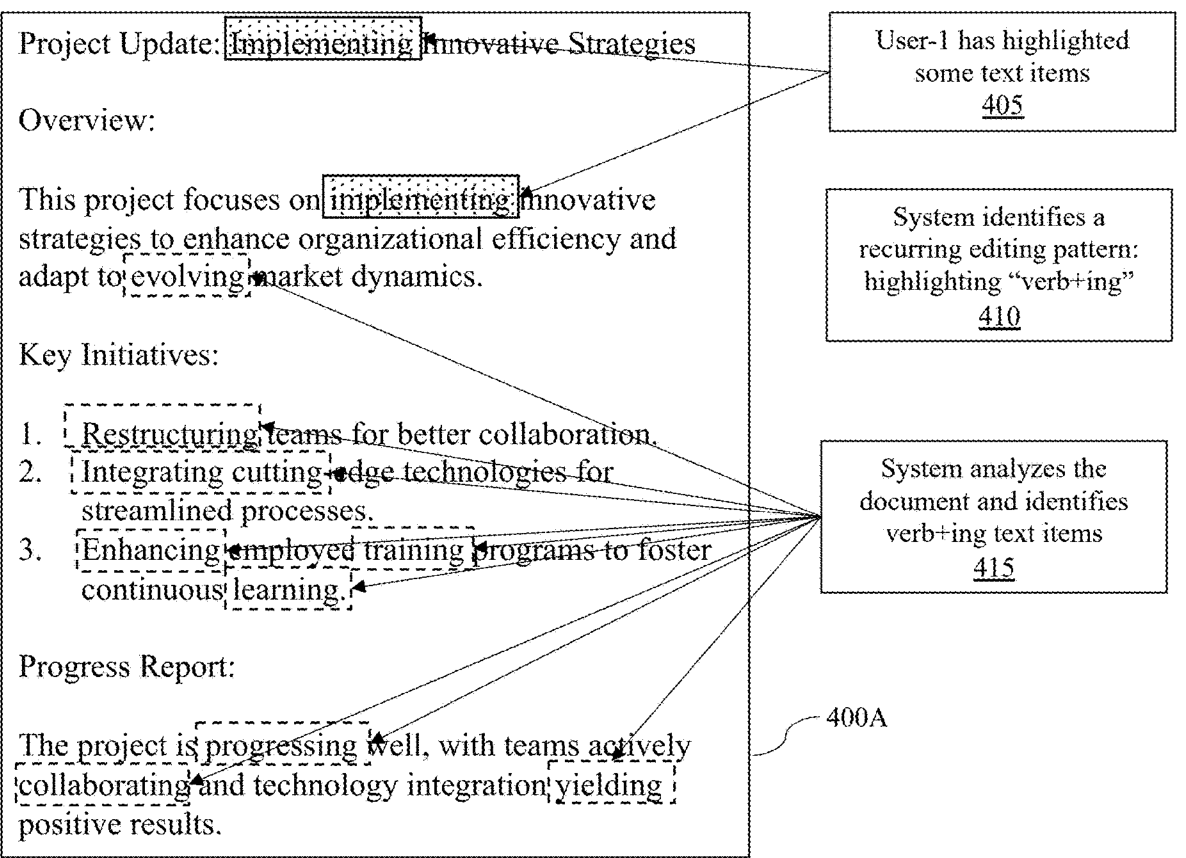
FIG. 4A illustrates an example electronic document with manual highlighting edits, in accordance with some embodiments of the present disclosure.

Referring now to FIG. 4A, shown is an example shared electronic document 400A with manual highlighting edits by a first user, in accordance with some embodiments of the present disclosure. The following example describes collaborative editing with consistency. For example, a team of writers (e.g., User-1 and User-2) collaborates on a large document, and they need to maintain a consistent writing style throughout. However, ensuring uniformity in formatting, terminology, and style across the document poses a challenge. Manual editing to enforce consistency is time-consuming, and it's difficult to keep track of changes made by multiple contributors. In the illustrated embodiment, User-1 has highlighted some text items or words (e.g., "Implementing" and "implementing"), shown at 405. The system analyzes the editing pattern and the related text items and identifies a recurring editing pattern of highlighting "verb+ing" words/items within the electronic document 400A, shown at 410. Based on the identified editing pattern, the system analyses the electronic document 400A and identifies all/remaining verb+ing text items/words, shown at 415.

Figure 4B:
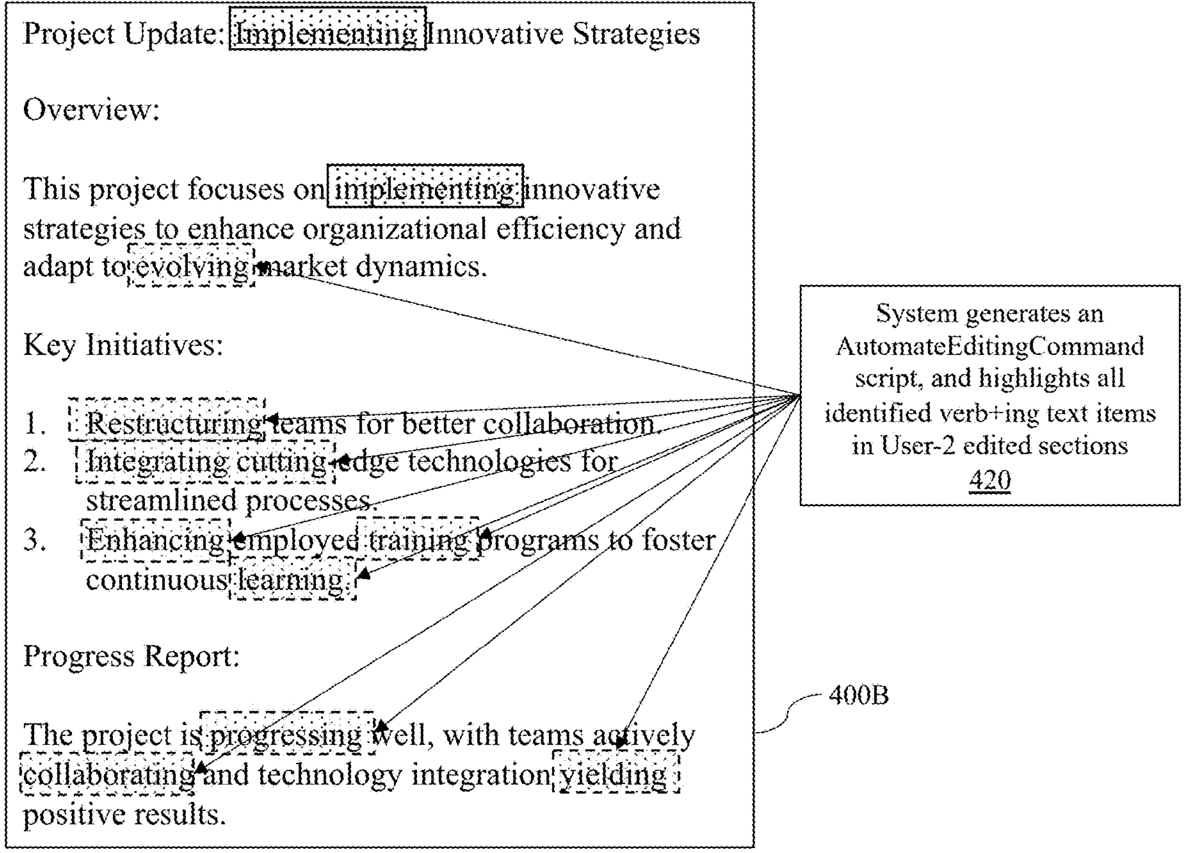
FIG. 4B illustrates an example electronic document with automated pattern-based highlighting edits, in accordance with some embodiments of the present disclosure.

Referring now to FIG. 4B, shown is an example shared electronic document 400B with automated pattern-based highlighting edits presented to a second user, in accordance with some embodiments of the present disclosure. In the illustrated embodiment, the system generates an automate editing command script based on User-1's editing pattern and deploys the script to implement the editing pattern on User-2's edited sections. For example, all "verb+ing" text items in User-2's edited sections are automatically highlighted by the deployed/executed script, shown at 420.

In this way, the automated pattern-based editing system, with its batch editing functionality and adaptive learning through HCl analysis, becomes an invaluable tool for the collaborative writing process. As contributors work on different sections, the automated pattern-based editing system recognizes patterns in their edits, ensuring consistent formatting and style across the entire shared document. The system adapts to the collective editing patterns of the team, providing a cohesive and polished final document without the need for extensive manual oversight.

Figure 5:
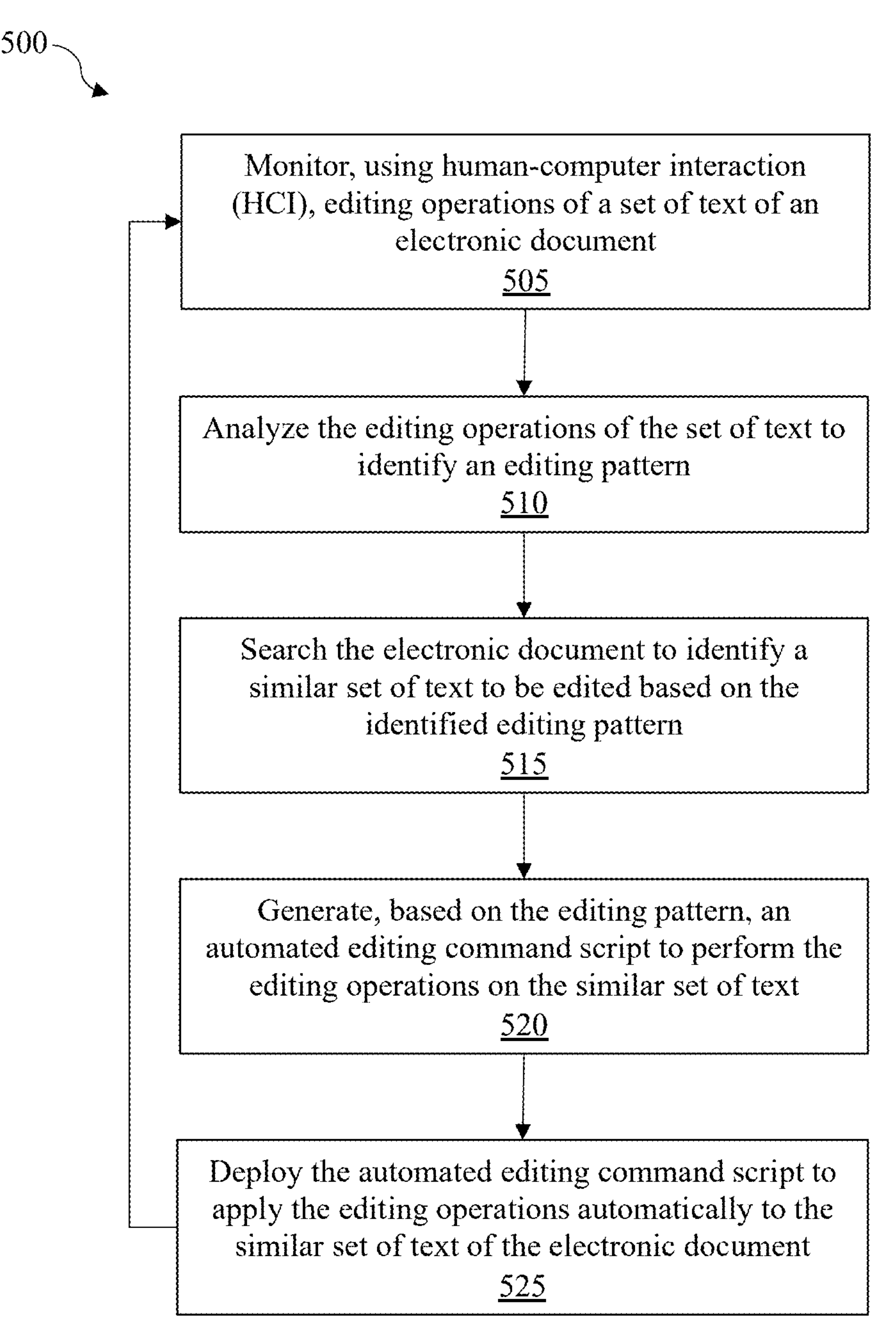
FIG. 5 illustrate a flow diagram of an example process for automated pattern-based editing of an electronic document, in accordance with some embodiments of the present disclosure.

Referring now to FIG. 5, shown is an example process 500 for automated feature dimensionality reduction for machine learning model training, in accordance with some embodiments of the present disclosure. The process 500 may be performed by processing logic that comprises hardware (e.g., circuitry, dedicated logic, programmable logic, microcode, etc.), software (e.g., instructions run on a processor), firmware, or a combination thereof. In some embodiments, the process 500 is a computer-implemented process. In embodiments, the process 500 may be performed by one or more processors of automated pattern-based editing system 100 exemplified in FIG. 1.

The process 500 begins by monitoring, using human-computer interaction (HCl), editing operations of a set of text of an electronic document. This is illustrated at step 505. In embodiments, the editing operations of the set of text may include any type of editing operation. For example, at least one or more editing operations selected from a group of recurring editing operations consisting of: highlighting text; emphasizing text to bold, italics, and/or underlined; modifying a font type of the text; modifying a font size of the text; modifying a font color; aligning the text; and adjusting spacing of text. In embodiments, the set of text comprises a set of similar types of words and/or phrases.

The process 500 continues by analyzing the editing operations of the set of text to identify an editing pattern. This is illustrated at step 510. For example, a user may be capitalizing all text that comprises surnames in a document, however there may be multiple instances of surnames to capitalize. The system is configured to identify the user's pattern of capitalizing the surnames.

The process 500 continues by searching the electronic document to identify a similar set of text to be edited based on the identified editing pattern. This is illustrated at step 515. For example, the system will automatically analyze the document to see if similar text remains in the document to be edited (e.g., further surnames that need to be capitalized).

The process 500 continues by generating, based on the editing pattern, an automated editing command script to perform the editing operations on the similar set of text. This is illustrated at step 520. For example, based on the user's editing pattern of capitalizing surnames in the document, the system automatically generates an automated editing command script for this editing pattern.

The process 500 continues by deploying the automated editing command script to apply the editing operations automatically to the similar set of text of the electronic document. This is illustrated at step 525. For example, the automated editing command script will be deployed and the remaining surnames that were not yet capitalized in the document will automatically be capitalized by the script, reducing the user's editing time.

In some embodiments, the process 500 returns to step 505, where the automated pattern-based editing system 100 continuously monitors editing operations of the electronic document to identify and apply further editing patterns to the document. For example, the system may identify other editing patterns such as the user formatting spacing of certain words, or subtitles and automatically generate and deploy a second automated editing command script accordingly.

In some embodiments, the process 500 may continue by monitoring, using HCl, user interactions in response to the automated editing command script applying the editing operations to the similar set of text of the electronic document; identifying, based on the monitoring, that the user has invalidated one or more editing operations that were applied to a first text of the similar set of text; and restoring, in response to the user invalidating the one or more editing operations, the similar set of text to the previous format prior to deploying the automated editing command script. For example, if the script incorrectly applies the wrong editing format, the system may automatically restore the text to the original version prior to running the script.

In some embodiments, the process 500 may continue by monitoring, using HCl, user interactions in response to the automated editing command script applying the editing operations to the similar set of text of the electronic document; identifying, based on the monitoring, that the user has modified one or more editing operations that were applied to a first text of the similar set of text; and adjusting, dynamically and based on the identifying, the automated editing command script to apply the modified one or more editing operations to the similar set of text. For example, the user may only slightly modify the editing format or pattern within the text of the document, where the system is configured to recognize the modification and dynamically update and run the script.

In some embodiments, the process 500 may continue by monitoring, using HCl, user interactions in response to the automated editing command script applying the editing operations to the similar set of text of the electronic document; and validating, in response to no manual changes being made to the editing operations of the similar set the text, the automated editing command script. For example, if the automated editing pattern that is applied by the script is valid the system will save the script within the editing pattern repository where it may be used on further documents or to make further formatting predictions.

In some embodiments, the process 500 may continue by training a machine learning model to identify one or more editing operations by analyzing historical user editing operations of a plurality of electronic documents; generating, by the machine learning model and based on the training, an editing pattern repository comprising a plurality of editing patterns; and updating the editing pattern repository with the identified editing pattern. In some embodiments, generating the automated editing command script to perform the editing operations on the similar set of text is performed by the trained machine learning model. For example, the machine learning model may analyze the user's historic editing patterns and make future editing pattern predictions based on those historic patterns. The machine learning model may use those predictions to predict editing patterns of similar or like users and apply them accordingly. In this way, the machine learning model adaptively learns how to apply editing patterns based on the user or similar users.

The automated pattern-based editing system is designed to enhance efficiency by automating repetitive editing tasks. This significant reduction in manual effort allows users to achieve formatting changes quickly and with greater speed, streamlining their overall workflow. Furthermore, the system ensures consistency across documents through automated batch editing, facilitating a uniform formatting style that is crucial for professionalism and readability.

Continuous improvement is integral to the automated pattern-based editing system, achieved through adaptive learning models. By evolving with user preferences and learning from each interaction, the system provides a more tailored and effective editing experience over time. Users benefit from a personalized editing experience with user-centric customization options, enabling them to define their preferences and align the system with their individual styles and requirements.

In collaborative writing projects, the automated pattern-based editing system excels in maintaining consistency. It uniformly applies formatting changes across contributions, ensuring a cohesive document style in group editing scenarios. The system's intelligent pattern recognition goes beyond basic find-and-replace functionalities, proactively identifying complex editing patterns in document content for more nuanced formatting decisions.

Real-time User Feedback Integration is a key feature of the system's Human-Computer Interaction (HCl) Analysis. By actively responding to user interactions, the Pattern-based editing system ensures a dynamic and responsive editing experience that aligns with evolving user preferences. The system also prioritizes the security and privacy of user data, implementing robust data encryption and access controls to instill confidence in users regarding the protection of sensitive information.

With an intuitive dashboard and customizable settings, the Pattern-based editing system prioritizes usability and a user-friendly interface. This design choice makes the system accessible to users with varying levels of technical expertise and allows customization to suit individual needs. Ultimately, the system contributes to time-saving and increased productivity by significantly reducing manual editing time, freeing up users to focus on more creative and strategic aspects of document creation.

Figure 6:
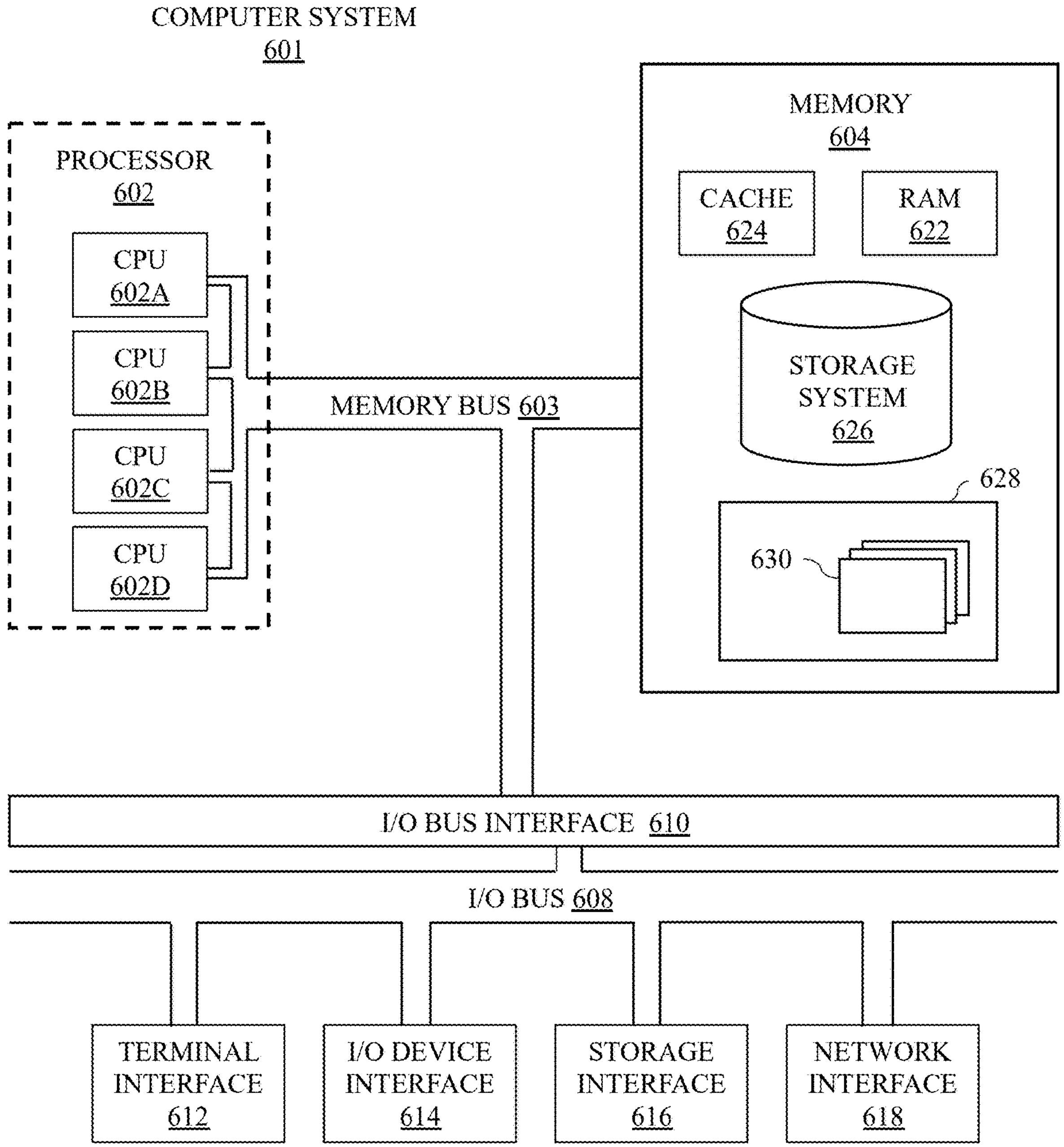
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache. In some embodiments, a processor can include at least one or more of, a memory controller, and/or storage controller. In some embodiments, the CPU can execute the processes included herein (e.g., process 500 as described in FIG. 5). In some embodiments, the computer system 601 may be configured as EPBE system 100 of FIG. 1.

System memory subsystem 604 may include computer system readable media in the form of volatile memory, such as random-access memory (RAM) 622 or cache memory 624. Computer system 601 may further include other removable/non-removable, volatile/non-volatile computer system data storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 604 can include flash memory, e.g., a flash memory stick drive or a flash drive. Memory devices can be connected to memory bus 603 by one or more data media interfaces. The memory subsystem 604 may include at least one program product having a set (e.g., at least one) of program modules that are configured to carry out the functions of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single units, the computer system 601 may, in some embodiments, contain multiple I/O bus interfaces 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory subsystem 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 628 and/or program modules 630 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pitslands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 7:
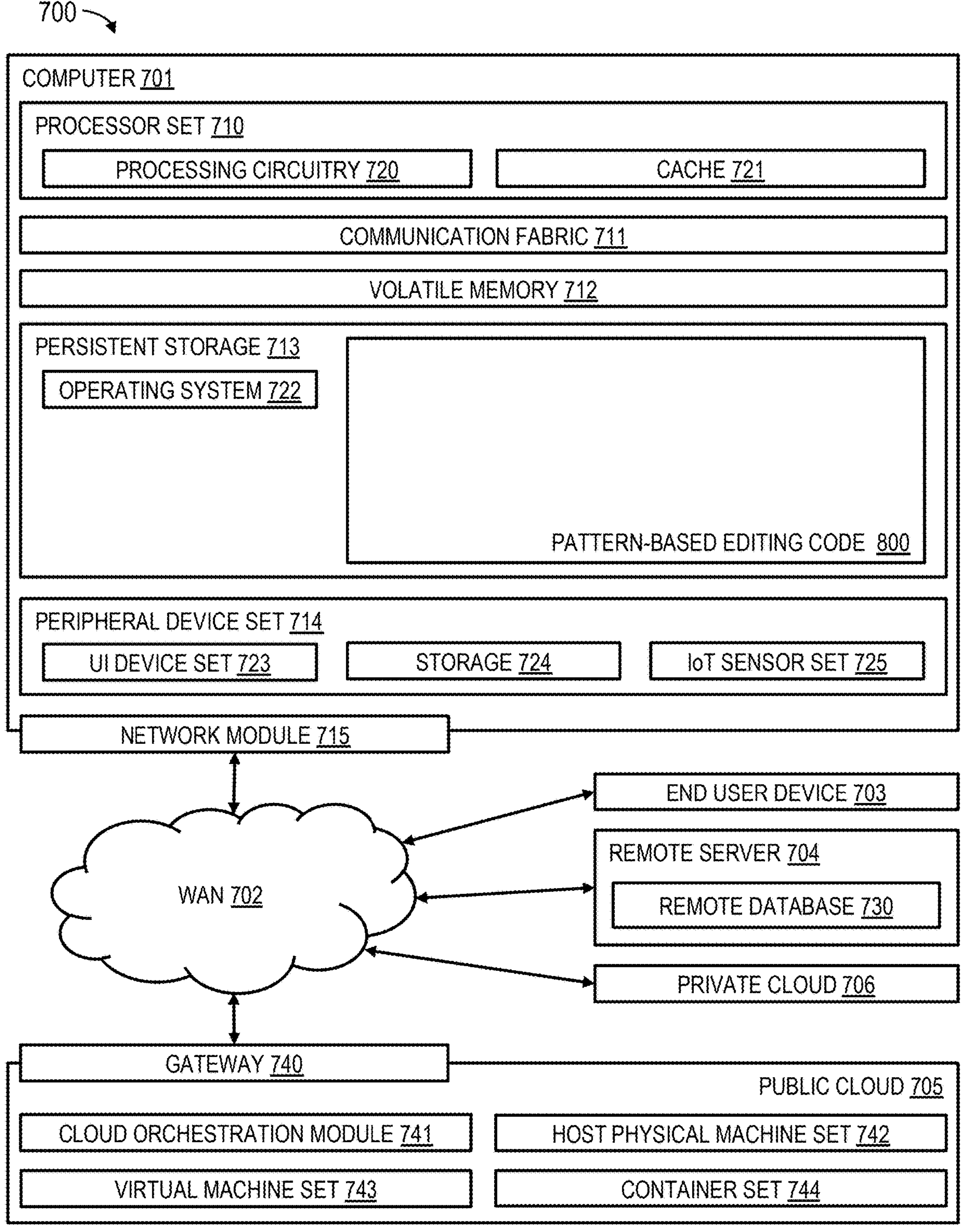
FIG. 7 depicts a schematic diagram of a computing environment for executing program code related to the methods disclosed herein and for automated pattern-based editing according to at least one embodiment.

Embodiments of the present disclosure may be implemented together with virtually any type of computer, regardless of the platform is suitable for storing and/or executing program code. FIG. 7 shows, as an example, a computing environment 700 (e.g., cloud computing system) suitable for executing program code related to the methods disclosed herein and for feature selection and management of machine learning models. In some embodiments, the computing environment 700 may be the same as or an implementation of the computing environment of pattern-based editing system 100.

Computing environment 700 contains an example of an environment for the execution of at least some of the computer code involved in performing the inventive methods, such as pattern-based editing code 800. The pattern-based editing code 800 may be a code-based implementation of the automated machine learning system 100. In addition to pattern-based editing code 800, computing environment 700 includes, for example, a computer 701, a wide area network (WAN) 702, an end user device (EUD) 703, a remote server 704, a public cloud 705, and a private cloud 706. In this embodiment, the computer 701 includes a processor set 710 (including processing circuitry 720 and a cache 721), a communication fabric 711, a volatile memory 712, a persistent storage 713 (including operating a system 722 and the feature selection code 600, as identified above), a peripheral device set 714 (including a user interface (UI) device set 723, storage 724, and an Internet of Things (IoT) sensor set 725), and a network module 715. The remote server 704 includes a remote database 730. The public cloud 705 includes a gateway 740, a cloud orchestration module 741, a host physical machine set 742, a virtual machine set 743, and a container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 730. As is well understood in the art of computer technology, and depending upon the technology, performance of a computer-implemented method may be distributed among multiple computers and/or between multiple locations. On the other hand, in this presentation of the computing environment 700, detailed discussion is focused on a single computer, specifically the computer 701, to keep the presentation as simple as possible. The computer 701 may be located in a cloud, even though it is not shown in a cloud in FIG. 7. On the other hand, the computer 701 is not required to be in a cloud except to any extent as may be affirmatively indicated.

The processor set 710 includes one, or more, computer processors of any type now known or to be developed in the future. The processing circuitry 720 may be distributed over multiple packages, for example, multiple, coordinated integrated circuit chips. The processing circuitry 720 may implement multiple processor threads and/or multiple processor cores. The cache 721 is memory that is located in the processor chip package(s) and is typically used for data or code that should be available for rapid access by the threads or cores running on the processor set 710. Cache memories are typically organized into multiple levels depending upon relative proximity to the processing circuitry. Alternatively, some, or all, of the cache for the processor set may be located "off chip." In some computing environments, the processor set 710 may be designed for working with qubits and performing quantum computing.

Computer readable program instructions are typically loaded onto the computer 701 to cause a series of operational steps to be performed by the processor set 710 of the computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 721 and the other storage media discussed below. The program instructions, and associated data, are accessed by the processor set 710 to control and direct performance of the inventive methods. In the computing environment 700, at least some of the instructions for performing the inventive methods may be stored in the pattern-based editing code 800 in the persistent storage 713.

The communication fabric 711 is the signal conduction path that allows the various components of the computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 712 is any type of volatile memory now known or to be developed in the future. Examples include dynamic type random access memory (RAM) or static type RAM. Typically, the volatile memory 712 is characterized by random access, but this is not required unless affirmatively indicated. In the computer 701, the volatile memory 712 is located in a single package and is internal to the computer 701, but, alternatively or additionally, the volatile memory may be distributed over multiple packages and/or located externally with respect to the computer 701.

The persistent storage 713 is any form of non-volatile storage for computers that is now known or to be developed in the future. The non-volatility of this storage means that the stored data is maintained regardless of whether power is being supplied to the computer 701 and/or directly to the persistent storage 713. The persistent storage 713 may be a read only memory (ROM), but typically at least a portion of the persistent storage allows writing of data, deletion of data and re-writing of data. Some familiar forms of persistent storage include magnetic disks and solid-state storage devices. The operating system 722 may take several forms, such as various known proprietary operating systems or open-source Portable Operating System Interface-type operating systems that employ a kernel. The code included in the pattern-based editing code 800 typically includes at least some of the computer code involved in performing the inventive methods.

The peripheral device set 714 includes the set of peripheral devices of the computer 701. Data communication connections between the peripheral devices and the other components of the computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 723 may include components such as a display screen, speaker, microphone, wearable devices (such as goggles and smart watches), keyboard, mouse, printer, touchpad, game controllers, and haptic devices. The storage 724 is external storage, such as an external hard drive, or insertable storage, such as an SD card. The storage 724 may be persistent and/or volatile. In some embodiments, the storage 724 may take the form of a quantum computing storage device for storing data in the form of qubits. In embodiments where the computer 701 is required to have a large amount of storage (for example, where the computer 701 locally stores and manages a large database) then this storage may be provided by peripheral storage devices designed for storing very large amounts of data, such as a storage area network (SAN) that is shared by multiple, geographically distributed computers. The IoT sensor set 725 is made up of sensors that can be used in Internet of Things applications. For example, one sensor may be a thermometer and another sensor may be a motion detector.

The network module 715 is the collection of computer software, hardware, and firmware that allows the computer 701 to communicate with other computers through the WAN 702. The network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 715 are performed on the same physical hardware device. In other embodiments (for example, embodiments that utilize software-defined networking (SDN)), the control functions and the forwarding functions of the network module 715 are performed on physically separate devices, such that the control functions manage several different network hardware devices. Computer readable program instructions for performing the inventive methods can typically be downloaded to the computer 701 from an external computer or external storage device through a network adapter card or network interface included in the network module 715.

The WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 703 is any computer system that is used and controlled by an end user (for example, a customer of an enterprise that operates the computer 701) and may take any of the forms discussed above in connection with the computer 701. The EUD 703 typically receives helpful and useful data from the operations of the computer 701. For example, in a hypothetical case where the computer 701 is designed to provide a recommendation to an end user, this recommendation would typically be communicated from the network module 715 of the computer 701 through the WAN 702 to the EUD 703. In this way, the EUD 703 can display, or otherwise present, the recommendation to an end user. In some embodiments, the EUD 703 may be a client device, such as thin client, heavy client, mainframe computer, desktop computer and so on.

The remote server 704 is any computer system that serves at least some data and/or functionality to the computer 701. The remote server 704 may be controlled and used by the same entity that operates computer 701. The remote server 704 represents the machine(s) that collect and store helpful and useful data for use by other computers, such as the computer 701. For example, in a hypothetical case where the computer 701 is designed and programmed to provide a recommendation based on historical data, then this historical data may be provided to the computer 701 from the remote database 730 of the remote server 704.

The public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 705 is performed by the computer hardware and/or software of the cloud orchestration module 741. The computing resources provided by the public cloud 705 are typically implemented by virtual computing environments that run on various computers making up the computers of the host physical machine set 742, which is the universe of physical computers in and/or available to the public cloud 705. The virtual computing environments (VCEs) typically take the form of virtual machines from the virtual machine set 743 and/or containers from the container set 744. It is understood that these VCEs may be stored as images and may be transferred among and between the various physical machine hosts, either as images or after instantiation of the VCE. The cloud orchestration module 741 manages the transfer and storage of images, deploys new instantiations of VCEs and manages active instantiations of VCE deployments. The gateway 740 is the collection of computer software, hardware, and firmware that allows the public cloud 705 to communicate through the WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 706 is similar to the public cloud 705, except that the computing resources are only available for use by a single enterprise. While the private cloud 706 is depicted as being in communication with the WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 705 and the private cloud 706 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 722 and the feature selection code 600 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:

monitoring, using human-computer interaction (HCl) analysis, editing operations of a set of text of an electronic document;

analyzing the editing operations of the set of text to identify an editing pattern;

searching the electronic document to identify a similar set of text to be edited based on the identified editing pattern;

generating, based on the editing pattern, an automated editing command script to perform the editing operations on the similar set of text;

deploying the automated editing command script to apply the editing operations automatically to the similar set of text of the electronic document monitoring, using HCl analysis, user interactions in response to the automated editing command script applying the editing operations to the similar set of text of the electronic document;

identifying, based on the monitoring, that the user has invalidated one or more editing operations that were applied to a first text of the similar set of text; and restoring, in response to the user invalidating the one or more editing operations, the similar set of text to a previous format prior to deploying the automated editing command script.

2. The method of claim 1, further comprising:

training a machine learning model to identify one or more editing operations by analyzing historical user editing operations of a plurality of electronic documents;

generating, by the machine learning model and based on the training, an editing pattern repository comprising a plurality of editing patterns; and updating the editing pattern repository with the identified editing pattern.

3. The method of claim 2, wherein generating the automated editing command script to perform the editing operations on the similar set of text is performed by the trained machine learning model.

4. The method of claim 1, wherein the editing operations of the set of text includes at least one or more editing operations selected from a group of recurring editing operations consisting of:

highlighting text;

emphasizing text to bold, italics, and/or underlined;

modifying a font type of the text;

modifying a font size of the text;

modifying a font color;

aligning the text; and adjusting spacing of text.

5. The method of claim 1, wherein the set of text comprises a set of similar types of words and/or phrases.

6. The method of claim 1, wherein generating the automated editing command script is further based on analyzing a set of learned user specific editing preferences.

7. A system comprising:

a processor; and a computer-readable storage medium communicatively coupled to the processor and storing program instructions which, when executed by the processor, cause the processor to perform a method comprising:

monitoring, using human-computer interaction (HCl) analysis, editing operations of a set of text of an electronic document;

analyzing the editing operations of the set of text to identify an editing pattern;

searching the electronic document to identify a similar set of text to be edited based on the identified editing pattern;

generating, based on the editing pattern, an automated editing command script to perform the editing operations on the similar set of text;

deploying the automated editing command script to apply the editing operations automatically to the similar set of text of the electronic document monitoring, using HCl analysis, user interactions in response to the automated editing command script applying the editing operations to the similar set of text of the electronic document;

identifying, based on the monitoring, that the user has modified one or more editing operations that were applied to a first text of the similar set of text; and adjusting, dynamically and based on the identifying, the automated editing command script to apply the modified one or more editing operations to the similar set of text.

8. The system of claim 7, wherein the method performed by the processor further comprises:

training a machine learning model to identify one or more editing operations by analyzing historical user editing operations of a plurality of electronic documents;

generating, by the machine learning model and based on the training, an editing pattern repository comprising a plurality of editing patterns; and updating the editing pattern repository with the identified editing pattern.

9. The system of claim 8, wherein generating the automated editing command script to perform the editing operations on the similar set of text is performed by the trained machine learning model.

10. A computer program product comprising a computer-readable storage medium having program instructions embodied therewith, the program instructions executable by a processor to cause the processor to perform a method comprising:

monitoring, using human-computer interaction (HCl) analysis, editing operations of a set of text of an electronic document;

analyzing the editing operations of the set of text to identify an editing pattern;

searching the electronic document to identify a similar set of text to be edited based on the identified editing pattern;

generating, based on the editing pattern, an automated editing command script to perform the editing operations on the similar set of text;

deploying the automated editing command script to apply the editing operations automatically to the similar set of text of the electronic document monitoring, using HCl analysis, user interactions in response to the automated editing command script applying the editing operations to the similar set of text of the electronic document;

identifying, based on the monitoring, that the user has modified one or more editing operations that were applied to a first text of the similar set of text; and adjusting, dynamically and based on the identifying, the automated editing command script to apply the modified one or more editing operations to the similar set of text.

11. The computer program product of claim 10, wherein the method performed by the processor further comprises:

training a machine learning model to identify one or more editing operations by analyzing historical user editing operations of a plurality of electronic documents;

generating, by the machine learning model and based on the training, an editing pattern repository comprising a plurality of editing patterns; and updating the editing pattern repository with the identified editing pattern.

* * * * *